United States Patent
Bell et al.

(10) Patent No.: US 7,755,650 B2
(45) Date of Patent: *Jul. 13, 2010

(54) ILLUMINATION MODULATION TECHNIQUE

(75) Inventors: Cynthia S. Bell, Chandler, AZ (US); Paul Winer, Santa Clara, CA (US); Andrew H. Steinbach, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 1513 days.

This patent is subject to a terminal disclaimer.

(21) Appl. No.: 11/014,928

(22) Filed: Dec. 17, 2004

(65) Prior Publication Data

US 2006/0132510 A1 Jun. 22, 2006

(51) Int. Cl.
*G09G 5/10* (2006.01)

(52) U.S. Cl. .................... 345/691; 359/237

(58) Field of Classification Search ............ 345/691, 345/98, 207; 375/238; 348/759, 751, 757; 359/242, 237, 267, 385, 388, 495; 349/25, 349/110, 114, 115; 353/20, 34, 84; 356/484, 356/499

See application file for complete search history.

(56) References Cited

U.S. PATENT DOCUMENTS

| | | | |
|---|---|---|---|
| 6,300,924 B1 * | 10/2001 | Markandey et al. | 345/84 |
| 6,998,928 B2 * | 2/2006 | Stengel et al. | 332/109 |
| 7,206,343 B2 * | 4/2007 | Pearce | 375/238 |
| 2006/0132471 A1 * | 6/2006 | Winer et al. | 345/204 |

OTHER PUBLICATIONS

U.S. Appl. No. 11/014,929, entitled, "Illumination Modulation Technique," filed Dec. 17, 2004.

Jong Myoung Park et al., "12.4: A 1080 Line, Single Panel LCOS Rear Projection System With A Rotating Drum," SID 04 Digest, pp. 178-181.

* cited by examiner

*Primary Examiner*—Abbas I Abdulselam
(74) *Attorney, Agent, or Firm*—Kevin A. Reif

(57) ABSTRACT

A technique includes pulse width modulating an illuminating beam of a light to establish a pixel intensity and modulating the illuminating beam to create different tonal resolution ranges for the pixel intensity.

18 Claims, 16 Drawing Sheets

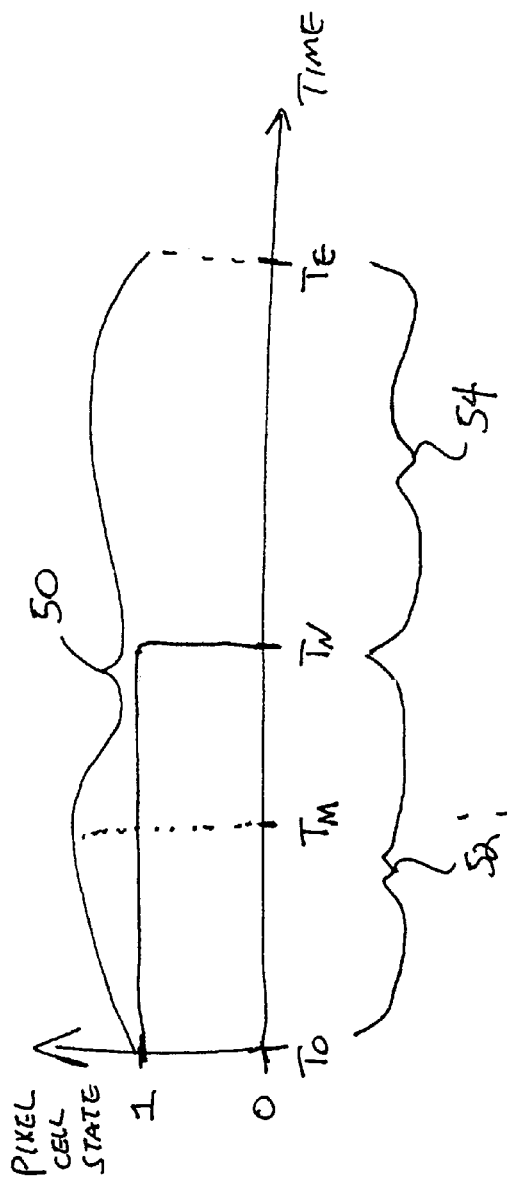
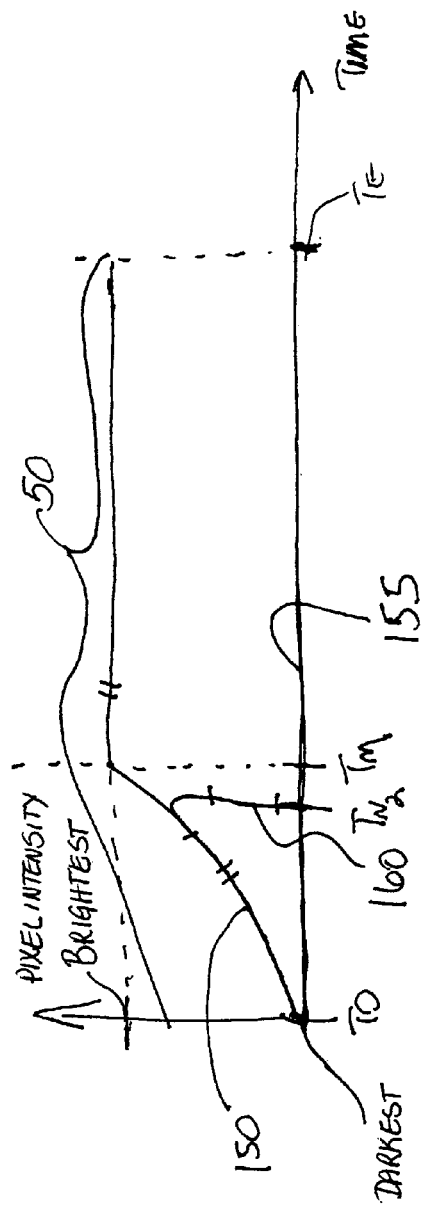
FIG. 8
FIG. 9

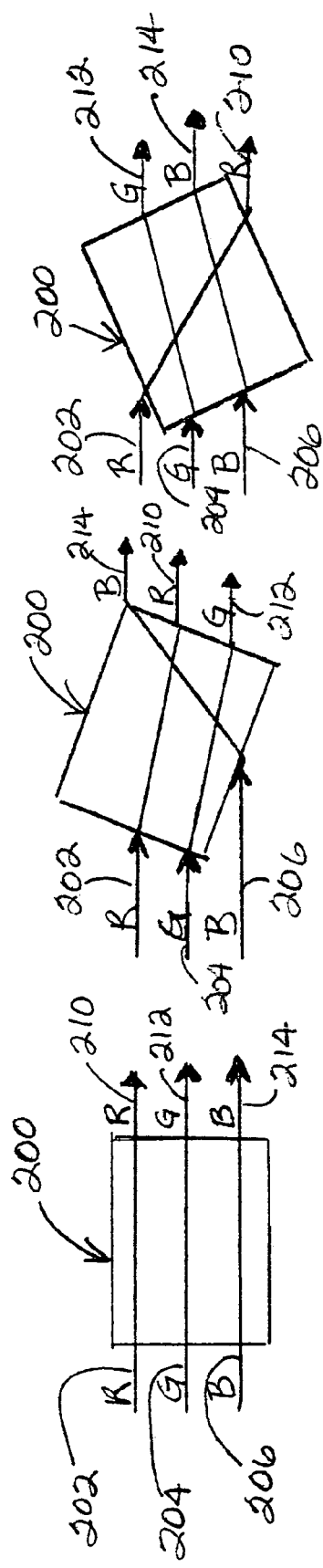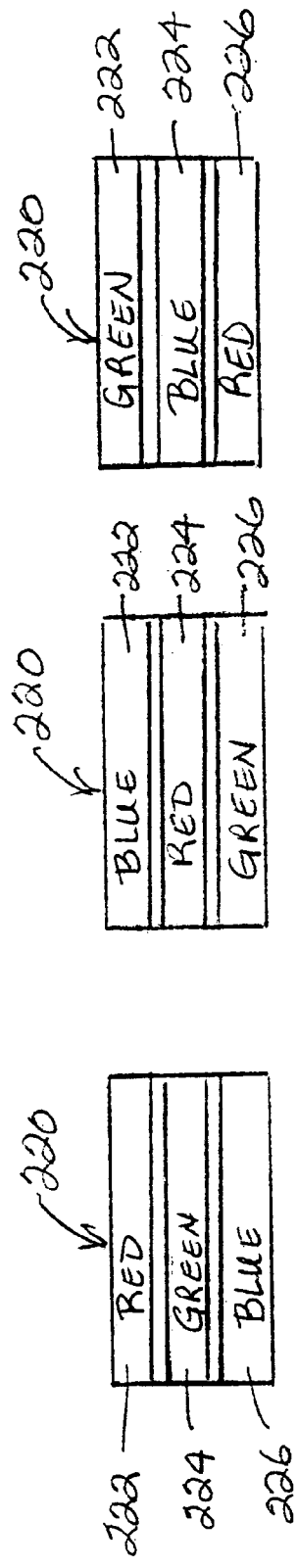
FIG. 11
FIG. 12
FIG. 13
FIG. 14
FIG. 15
FIG. 14

ILLUMINATION MODULATION TECHNIQUE

BACKGROUND

The invention generally relates to an illumination modulation technique.

A projection display system typically includes one or more spatial light modulators (SLMs) that modulate light for purposes of producing a projected image. The SLM may include, for example, a liquid crystal display (LCD) such as a high temperature polysilicon LCD panel or a liquid crystal on silicon (LCOS) microdisplay, a grating light valve or a MEMs (where "MEMs stands for micro-electro-mechanical devices") light modulator such as a digital mirror display (DMD) to modulate light that originates from a lamp of the projection display system. In typical projection display systems, the lamp output is formatted with optics to deliver a uniform illumination level on the surface of the SLM. The SLM forms a pictorial image by modulating the illumination into spatially distinct tones ranging from dark to bright based on supplied video data. Additional optics then relay and magnify the modulated illumination pattern onto a screen for viewing.

The SLM typically includes an array of pixel cells, each of which is electrically controllable to establish the intensity of a pixel of the projected image. In some projection display systems, SLMs are transmissive and in others, they are reflective. For the purposes of simplification, the discussion will address reflective SLMs. An SLM may be operated so that each pixel has only two states: a default reflective state which causes either a bright or a dark projected pixel and a non-default reflective state which causes the opposite projected pixel intensity. In the case of an LCOS SLM, the pre-alignment orientation of the LC material and any retarders in the system determine whether the default reflective state is normally bright or normally dark. For the purposes of simplification, the discussion will denote the default reflective state as normally bright, i.e., one in which the pixel cell reflects incident light into the projection lens (the light that forms the projected image) to form a corresponding bright pixel of the projected image. Thus, in its basic operation, the pixel cell may be digitally-controlled to form either a dark pixel (in its non-default reflective state) or a bright pixel (in its default reflective state). In the case of a DLP SLM, the states may represent the pixel in a co-planar position to the underlying substrate.

Although its pixels are operated digitally, the above-described SLM may also be used in an application to produce visually perceived pixel intensities (called "gray scale intensities") between the dark and bright levels. For such an application, each pixel may be controlled by pulse width modulation (PWM), a control scheme that causes the human eye to perceive gray scale intensities in the projected image, although each pixel cell still only assumes one of two states at any one time. The human visual system perceives a temporal average of pixel intensity when the PWM control operates at sufficiently fast rates.

In the PWM control scheme, a pixel intensity (or tone) is established by controlling the time that the pixel cell stays in its reflective state and the time that the pixel cell remains in the non-reflective state during an interval time called a PWM cycle. This type of control is also referred to as duty cycle control in that the duty cycle (the ratio of the time that the pixel cell is in its reflective state to the total time the pixel cell is in its non-reflective and reflective states) of each PWM cycle is controlled to set the pixel intensity. A relatively bright pixel intensity is created by having the pixel cell spend a predominant proportion of time in its reflective state during the PWM cycle, while a relatively dark pixel intensity is created by having the pixel cell spend a predominant amount of time in its non-reflective state during the PWM cycle.

The quality of the projected image typically is a function of the number of possible gray scale intensities, also called the "bit depth." For the above-described PWM control scheme, a bit depth of "N" means that the PWM cycle is divided into $2^N$ time consecutive and non-overlapping time segments. For a particular PWM cycle, each of the time segments in which the pixel cell is in its reflective state contributes to the overall luminance of the corresponding pixel. Each time segment of the PWM cycle typically corresponds in duration to the cycle of a clock signal. Thus, the larger the number of time segments (i.e., the greater the number of gray scale intensities), the higher the frequency of this clock signal, thereby requiring a high speed clock to form the pixel grayscale or tonal range. Power consumption is also a function of this clock frequency and also increases with bit depth.

Other factors may increase the clock rate needed for a particular bit depth. For example, for a three SLM LCD panel projection system (one SLM for each primary color), the PWM cycle may have a period that is equal to one half of the video data's field time (typically 1/60 second). Opposite drive voltage polarities are needed in LCD systems to prevent voltage bias accumulation. This is well known for liquid crystal display systems. Thus, LCD SLM devices require two PWM cycles in each video data field. This doubles the clock rate requirement.

For a two SLM panel projection system where one of the SLM panels is temporally shared by two primary colors, the video frame time must be split to allocate PWM cycles to each primary color, thereby increasing the needed PWM clock rate if the same bit depth is maintained in all colors.

For a one SLM panel projection system with an SLM panel temporally shared by all three primary colors, the video frame time must be further subdivided. For an LCOS SLM the video frame time would be divided into six PWM cycles, a pair for each primary color. The PWM clock period may have an even shorter duration when the unequal length PWM cycles are needed to adjust the display white point. Since common projection lamps are rich in blue and weak in red output, it is generally necessary to devote longer portions of the video frame time to red to achieve white balance. This necessitates the PWM clock period to be increasingly small and the clock frequently and power consumption to be increasingly high.

BRIEF DESCRIPTION OF THE DRAWING

FIG. 8 is an illustration of a timing for a pulse width modulation cycle according to an embodiment of the invention.

FIG. 9 illustrates different exemplary pixel intensities during a pulse width modulation scheme according to an embodiment of the invention.

FIGS. 11, 12 and 13 depict a rotating polarizing beam splitting prism in different orientations according to an embodiment of the invention.

FIGS. 14, 15 and 16 illustrate illumination of a spatial light modulator for the different prism orientations depicted in FIGS. 11, 12 and 13, respectively, according to an embodiment of the invention.

FIGS. 21 and 22 are flow diagrams depicting techniques to control a perceived contrast of a projected image according to different embodiments of the invention.

DETAILED DESCRIPTION

Figure 1:
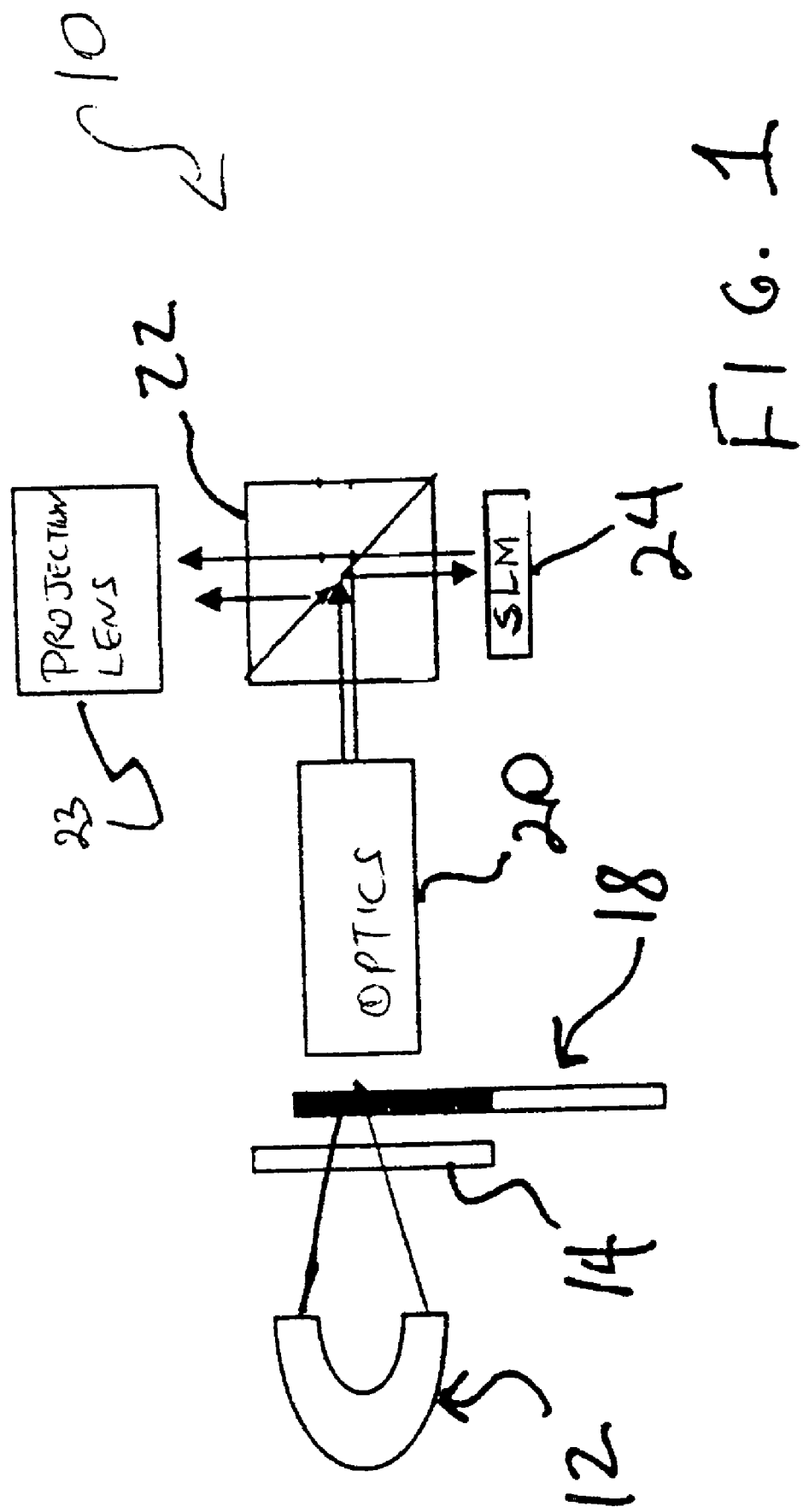
FIG. 1 is a schematic diagram of a projection display system according to an embodiment of the invention.

Referring to FIG. 1, a projection display system 10 in accordance with an embodiment of the invention includes one or more spatial light modulators (SLMs) 24 (one shown in FIG. 1) that modulate impinging light to produce a projected composite, color optical image (herein called "the projected image"). The SLM 24 may be either a liquid crystal (LC) SLMs, a tilt-mirror SLM, or a MEMs-type SLM, depending on the particular embodiment of the invention. Unless otherwise stated, embodiments described herein use LC SLMs for purposes of simplifying the description. However, it is understood that other SLMs, such as grating light valve, HTPS, or other technology SLMs, may be used, in other embodiments of the invention. Furthermore, unless otherwise noted below, the projection display system 10 includes a single SLM 24, for purposes of simplifying the following description, although other projection systems that have multiple SLMs may be alternatively used and are within the scope of the appended claims.

In accordance with some embodiments of the invention, the projection display system 10 includes a lamp 12 (a mercury lamp, for example) that produces a broad visible spectrum illumination beam that passes through an ultraviolet/infrared (UV/IR) filter 14 of the system 10. The light passing from the filter 14, in turn, passes through a rotating color wheel, such as a color wheel 18 that is also depicted in FIG. 2.

Figure 2:
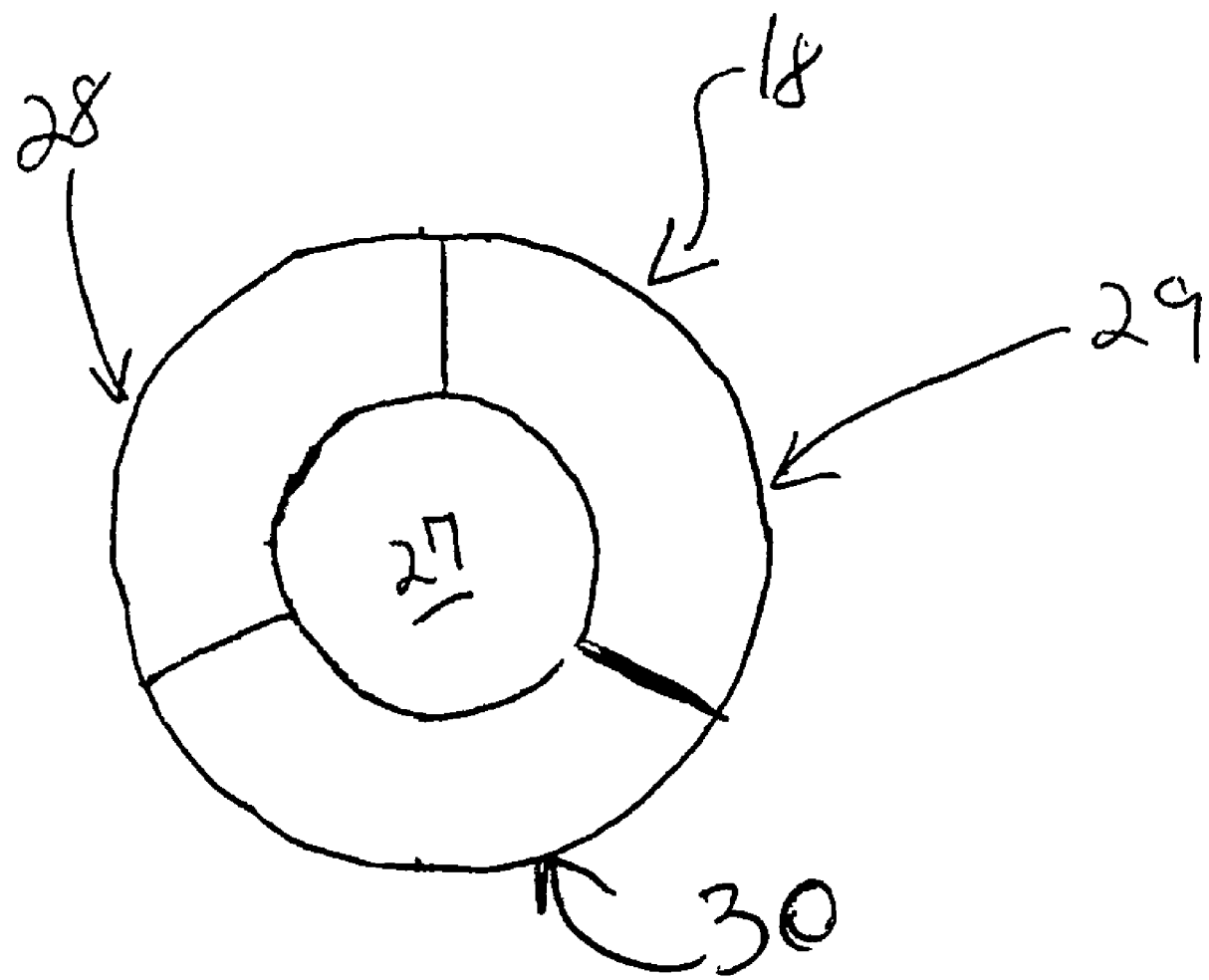
FIG. 2 is a view of a light impinging face of a color filter wheel.

Referring to FIG. 1 in conjunction with FIG. 2, a function of the color wheel 18 is to serve as a time-varying wavelength filter to allow certain wavelengths of light to pass therethrough at the appropriate times so that the filtered light may be modulated by the SLM 24 to produce the projected image.

More specifically, in some embodiments of the invention, the projection display system 10 may be a shared color system, a system in which, for example, the SLM 24 modulates red, followed by green, followed by blue light. Thus, the SLM 24 is temporally shared to modulate different primary color beams.

In such a shared color projection display system, a light impinging face of the color filter wheel 18 may be, as depicted in FIG. 2, generally divided so that one arcuate region 28 of the wheel 18 serves as a wavelength filter to select certain wavelengths of light and other arcuate regions 29 and 30 of the wheel 18 select other wavelengths of light. The light from the UV/IR filter 14 (FIG. 1) is incident on a "spot" on an outer circular track of the color wheel 18, a track that coincides with the arcuate regions 28, 29 and 30.

A non light-filtering and central interior region 27 of the color wheel 18 does not receive the beam from the UV/IR filter 14. The region 27 may receive a spindle (not shown) that is connected to a motor (not shown) for purposes of rotating the wheel 18 to filter light from UV/IR filter 14 via one of the arcuate regions 28, 29 and 30. Thus, the light beam that is incident upon the color filter wheel 18 is eccentric with respect to the center of the wheel 18 so that the light beam is incident on one of the arcuate regions 28, 29 and 30 at any one time as the wheel 18 rotates. Various techniques (techniques using optical sensors, optical shaft encoders on the shaft of the motor, etc.) may be used to synchronize the rotation of the color wheel 18 with the modulation that is performed by the SLMs 24. More specifically, in some embodiments of the invention (further described below), the projection display system 10 includes a synchronizer (not shown) to synchronize the rotation of the color wheel so that the portion of the color wheel through which the light beam passes is more opaque when the SLM 24 is displaying darker tones.

As a more specific example of an embodiment of the color wheel, the arcuate region 28 of the color wheel 18 may be a magenta segment that allows red light to pass therethrough. For the phase of the color wheel's rotation in which the light from the UV/IR filter 14 passes through the arcuate region 28, the projection display system 10 (via a polarizing beam splitter 22 (FIG. 1)) directs the red light beam to the SLM 24 so that the SLM 24 modulates the red light. The arcuate region 29 of the color wheel may be a green segment that allows green light to pass. For the phase of the color wheel's rotation in which the light from the UV/IR filter 14 passes through the arcuate region 29, the projection display system 10 (via the beam splitter 22) directs the green light to the SLM 24. For the phase of the color wheel's rotation in which the light from the UV/IR filter 14 passes through the arcuate region 30, the projection display system 10 (via the beamsplitter 22) directs blue light to the SLM 24.

As previously stated, the single-SLM configuration that is depicted in FIG. 1 is for purposes of example only. Thus, the projection display system 10 may be replaced by another projection display system, in other embodiments of the invention, such as a projection display system that includes three SLMs, one for each primary color (red, green and blue, for example) of the projected image. As another example, in some embodiments of the invention, red, green and blue light may be temporally shared on an SLM in a two SLM display projection system. Therefore, many variations are possible and are within the scope of the appended claims.

Referring to FIG. 1, among its other components, the projection display system 10 includes homogenizing and beam shaping optics 20 that further shape and collimate the light that exits the color wheel 18, prepolarizes and directs the resultant beam to the polarizing beam splitter 22. The polarizing beam splitter (PBS) 22 separates the light from the color wheel 18 based on polarization. More specifically, assuming the single-SLM configuration described above, the polarizing beam splitter 22 directs the different color sub-bands of light (at different times) to the SLM 24. Once modulated by the SLMs 24, the polarizing beam splitter 22 directs the modulated beam through projection lenses 23 for purposes of forming the projected image.

Depending on the particular embodiment of the invention, the SLM 24 may be a digital mirror device (DMD), liquid crystal display (LCD) device, or other pixelated SLM. In some embodiments of the invention, the SLM 24 is a liquid crystal on silicon (LCOS) device that includes a liquid crystal layer that is formed on a silicon substrate in which circuitry (decoders, control circuits and registers, for example) to control and operate the device is fabricated.

Figure 3:
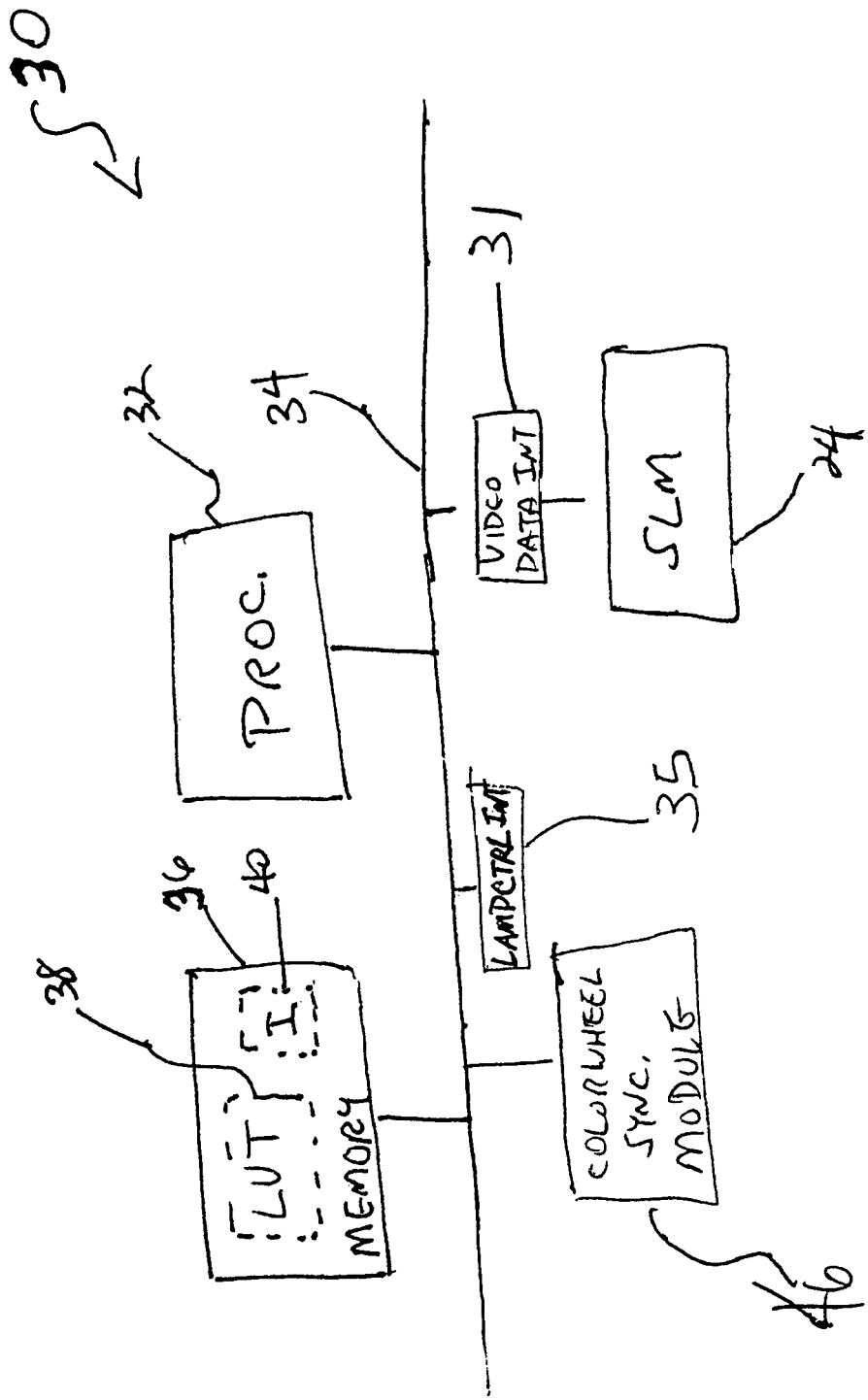
FIG. 3 is a block diagram of an electrical system of the projection display system according to an embodiment of the invention.

In some embodiments of the invention, an electrical system 30 for the projection display system 10 (FIG. 1) may have a general structure that is depicted in FIG. 3. Referring to FIG. 3, the electrical system 30 may include a processor 32 (one or more microcontrollers or microprocessors, as examples) that is coupled to a system bus 34. The processor 32 communicates over the system bus 34 with a memory 36 (a flash memory, for example) of the electrical system 30. The memory 36 stores instructions 40 to cause the processor 32 to perform one or more of the techniques that are described herein, as well as a look-up table (LUT) 38.

In some embodiments of the invention, the projection display system 10 (FIG. 1) operates the pixel cells of the SLM 24 in a digital fashion, in that each pixel cell at any one time is either in a reflective state or a non-reflective state. Gray scale intensities are achieved by pulse width modulation (PWM), a modulation technique that controls the optical behavior of the pixel cell during an interval of time called a PWM cycle to control the intensity of the corresponding pixel of the projected image. The PWM control regulates the amount of time that a particular pixel cell is in its reflective and non-reflective states during a PWM cycle for purposes of establishing a certain pixel intensity. The amount of time that the pixel cell is in each reflectivity state for a given pixel intensity value is established by the LUT 38, in some embodiments of the invention. It is noted that in some embodiments of the invention, the LUT 38 may represent a collection of LUTs, one for each primary color. For purposes of simplifying the discussion herein, only one LUT is assumed, unless otherwise stated. The LUT 38 indicates a PWM duty cycle for each potential pixel intensity value.

Among its other features, the electrical system 30 may include a color wheel synchronization module 46 and a video data interface 31 that are coupled to the system bus 34. The color wheel synchronization module 46 can serves to assist in ensuring that the physical position of the color wheel 18 is aligned with the start of a PWM timing cycle. The video data interface 31 receives pixel intensity data that is mapped through LUT 38 to specify per pixel PWM data (to drive the SLM 24).

In some embodiments of the invention, the LUT 38 includes a corresponding duty cycle entry for each unique pixel intensity value. The duty cycle entry indicates a duration that the pixel cell remains in its default reflective state during the PWM cycle to produce the desired pixel intensity. The pixel cell remains in the non-default reflective state during the remainder of the PWM cycle. In some embodiments of the invention, each table entry indicates a number of pulse width modulation (PWM) counts, or clock cycles, for each intensity value. These are the number of clock cycles that the pixel cell needs to remain in its default reflective state. For the remaining clock cycles of the PWM cycle (having a fixed duration, for example), the pixel cell is in its non-default reflective state. The PWM clock counts may be executed with the non-reflective portion first and the reflective portion second or with the reflective portion first and the non-reflective portion second. In other embodiments, fractions of the total reflective and non-reflective clock counts may be alternated during a PWM cycle. In any execution strategy, the LUT-prescribed time proportion remains consistent relative to the whole PWM cycle time.

Figure 4:
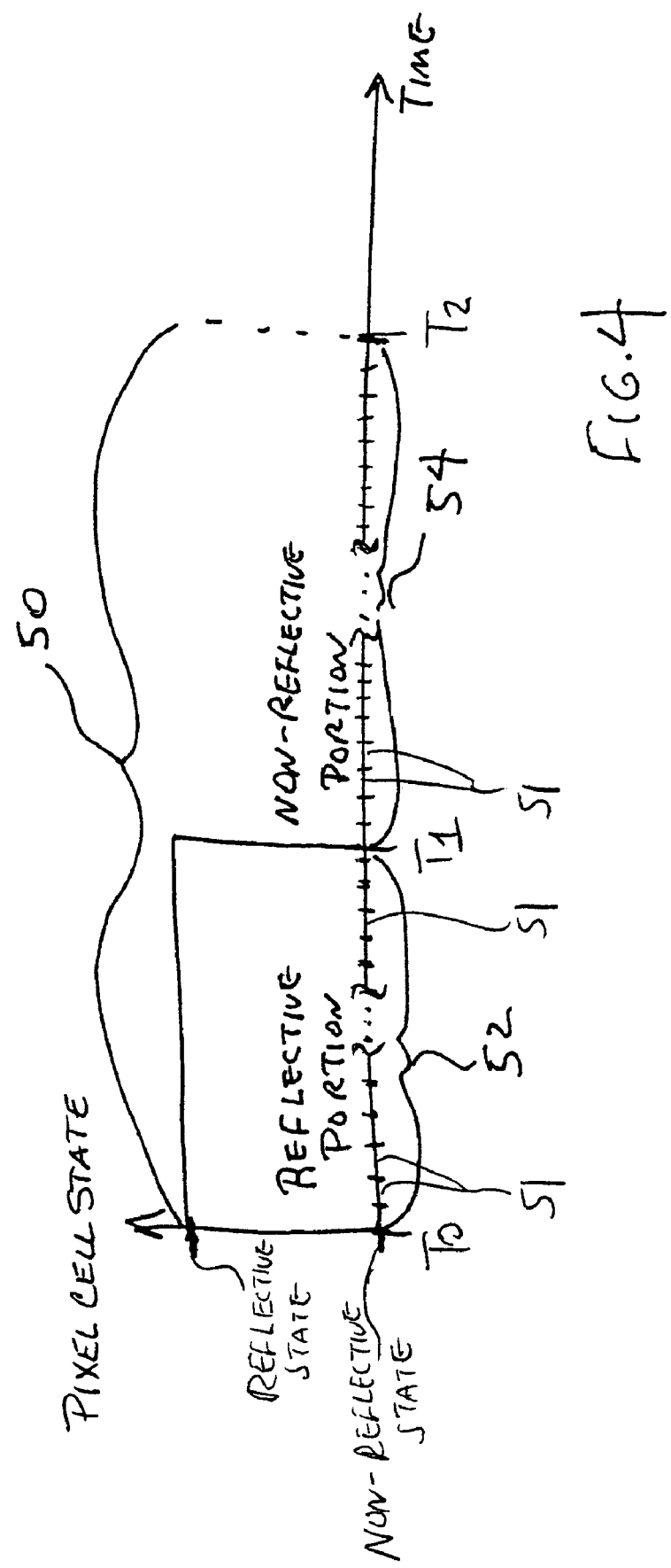
FIG. 4 is an illustration of a pulse width modulation control technique for a pixel cell according to an embodiment of the invention.

Referring to FIG. 3 in conjunction with FIG. 4, the processor 32, for a given video data value, retrieves the corresponding PWM count from the LUT 38. The retrieved value, in turn, determines the number of PWM clock counts that, in turn, govern the duration of a reflective portion 52 of a PWM cycle 50. The remaining counts form a non-reflective portion 54 (i.e., the remaining portion) of the PWM cycle 50. Stated differently, the PWM cycle 50 may be viewed as being formed from consecutive and non-overlapping time segments 51, each of which has the duration of a specified number of clock cycles. In some embodiments of the invention, the pixel cell, at the beginning of the PWM cycle 50, is in the non-reflective state. The number of PWM counts determine the number (if any) of time segments 51 from time $T_0$ until time $T_1$ (at the end of the reflective portion 52 of the PWM cycle 50) in which the pixel cell remains in the reflective state. At the conclusion (time $T_1$) of the reflective portion 52, the pixel cell transitions to its non-reflective state (to begin the non-reflective portion 54) until the end of the PWM cycle 50 at time $T_2$.

The duration of the PWM cycle 50 depends on the configuration of the projection display system. For the single LC SLM panel-configuration of the projection display system 10 (FIG. 1), the PWM cycle time is equal to a multiple of one sixth of the field time interval (1/60 seconds). The multiple may be set as desired to mitigate color breakup, a visual artifact associated with temporal color sequential displays. PWM cycle times may be at 1/240 Hz, 1/360 Hz, and so on. Each pair of PWM cycles is dedicated to an illumination color primary (red or green or blue). One PWM cycle asserts a first voltage polarity and the second PWM cycle asserts the opposite voltage polarity while driving the pixel cell to establish the pixel intensity (such as the PWM cycle 50). More specifically, the second PWM cycle should assert the bright state for the same duty cycle duration as the first PWM cycle, except that the voltage field across the LC material is reversed in polarity. Additionally, the reflectivity state sequence in the second PWM cycle may proceed in the reverse time order of the driving PWM cycle.

Using the retrieved value from the LUT 38, the processor 32, in accordance with some embodiments of the invention, utilizes the corresponding PWM count to time the duration of the PWM cycle for the respective pixel by means of the video data interface 31 (FIG. 3).

Figure 5:
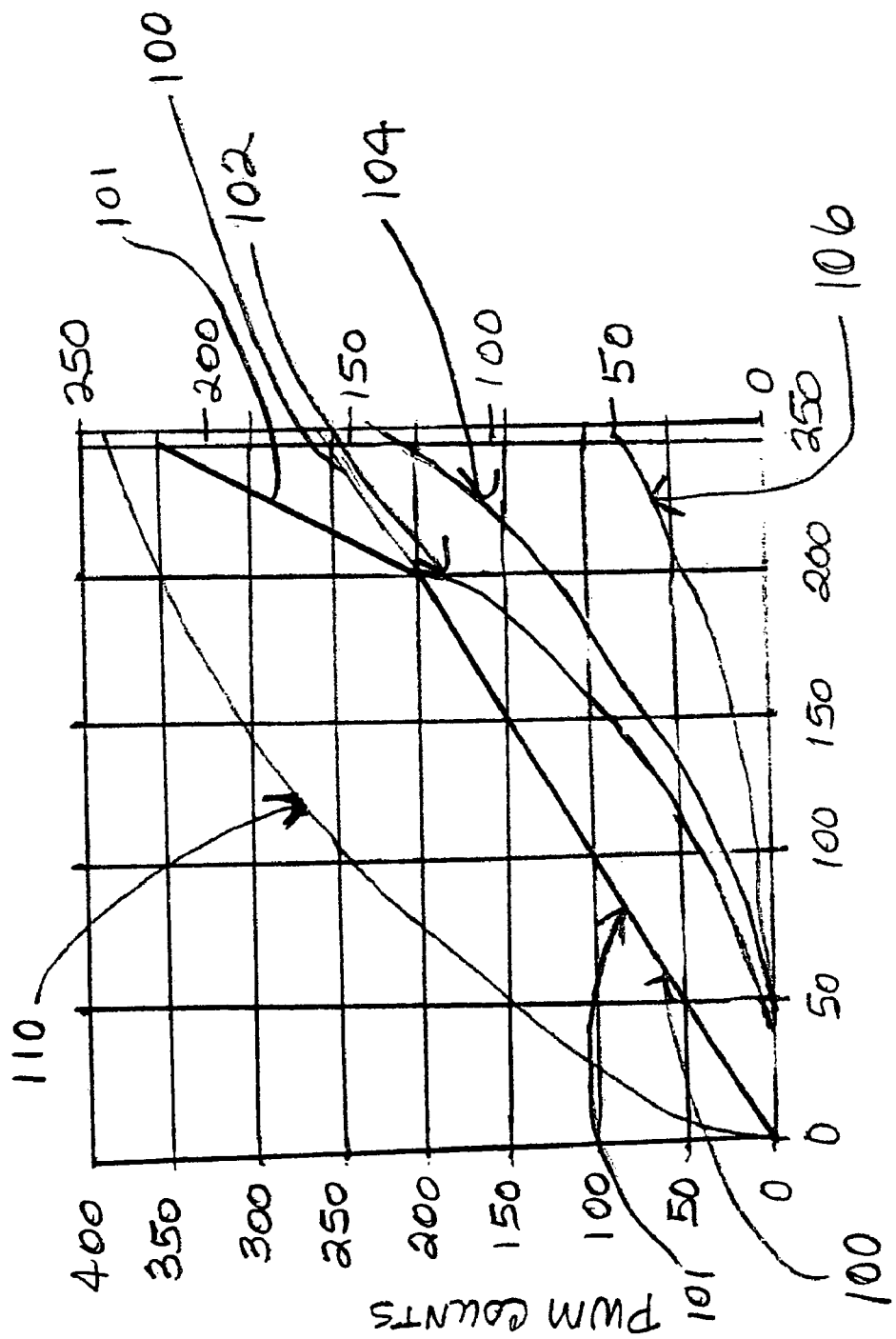
FIG. 5 depicts relationships between pixel intensities and a table index value.

Referring to FIG. 5, in some embodiments of the invention, the entries of the LUT 38 (FIG. 3) establish a relationship between the PWM counts and the received video data values (represented by "table index values" in FIG. 5). For example, the LUT 38 establishes, in conjunction with other features of the display projection system 10 described below, relationships between the video data values and the pixel intensities that appear in the projected image. However, the video data that is furnished to the projection display system 10 may not have a linear relationship to the pixel intensities that are required for the projected image because the video data may be pre-compensated to drive a non-linear cathode ray tube (CRT) display, for example.

More specifically, the video data that is furnished to the projection display system 10 (FIG. 1) may be pre-compensated to accommodate the non-linear responses of phosphors of a CRT display. Thus, a conventional CRT display receives the pre-compensated video data and directly drives the CRT tube with this data. However, for a SLM display system, such as the projection display system 10, the pre-compensation must be removed from the video data. Therefore, the relationship between the video data and the PWM counts should not be linear, but rather, should be non-linear in a manner that removes the CRT pre-compensation and applies gamma compensation appropriate for the SLM in the projection system. The correct gamma compensation required will depend on the voltage to reflectance transfer characteristics of the SLM as well as the application. For office displays, it is common to drive to a final optical gamma of 2.2, while for home theater, it is more common to drive to a final optical gamma of 2.5.

More specifically, still referring to FIG. 5, system 10 should establish a non-linear relationship between the video data that is furnished to the system 10 and the PWM clock counts. A curve 106, for example, represents the needed relationship imposed by the LUT 38 between the blue component video data and the blue SLM PWM count; a curve 104 represents the needed relationship between the green component video data and the green SLM PWM count; and a curve 102 represents the needed relationship between the red component video data and the red SLM PWM count.

As can be seen from FIG. 5, for the darker video levels (i.e., the smaller table index values), the compensated PWM count increases at a slower rate than for the brighter pixel intensity values (i.e., the larger table index values). The PWM clock count resolution (and thus, the video grayscale resolution, as appears in the projected image), is determined by the minimum PWM cycle clock duration is that required to form intensity changes that are small enough to be below the visual contouring threshold for the darkest tones. Because the PWM clock resolution also establishes the duration of the time segment 51 (see FIG. 4), the smaller the duration of the time size 51, the higher the frequency of the needed clock frequency. This may present challenges, in that a high clock frequency means a higher power consumption.

Therefore, in accordance with embodiments of the invention, an illumination modulation technique is used to establish multiple, in this example two pixel grayscale resolution levels from a single clock frequency: a first, higher resolution for the darker pixel intensities values; and a second, lower resolution for the brighter pixel intensities. As described below, as a result of the illumination modulation, the duration of the time segment 51 may be established based on the lower resolution and not on the higher resolution, thereby minimizing the clock frequency and effectively increasing the bit depth of the PWM modulation. To perform this modulation, in some embodiments of the invention, the color wheel 18 is modified from its depiction in FIG. 2 to temporally modulate the illumination that is applied to the SLM 24 so that during the portion of the PWM cycle that is associated with the darker pixel intensity values, a lower illumination level is applied to the SLM; and, conversely, during the remaining portion of the PWM cycle that is associated with the brighter pixel intensities, a higher illumination level is applied to the SLM.

Figure 7:
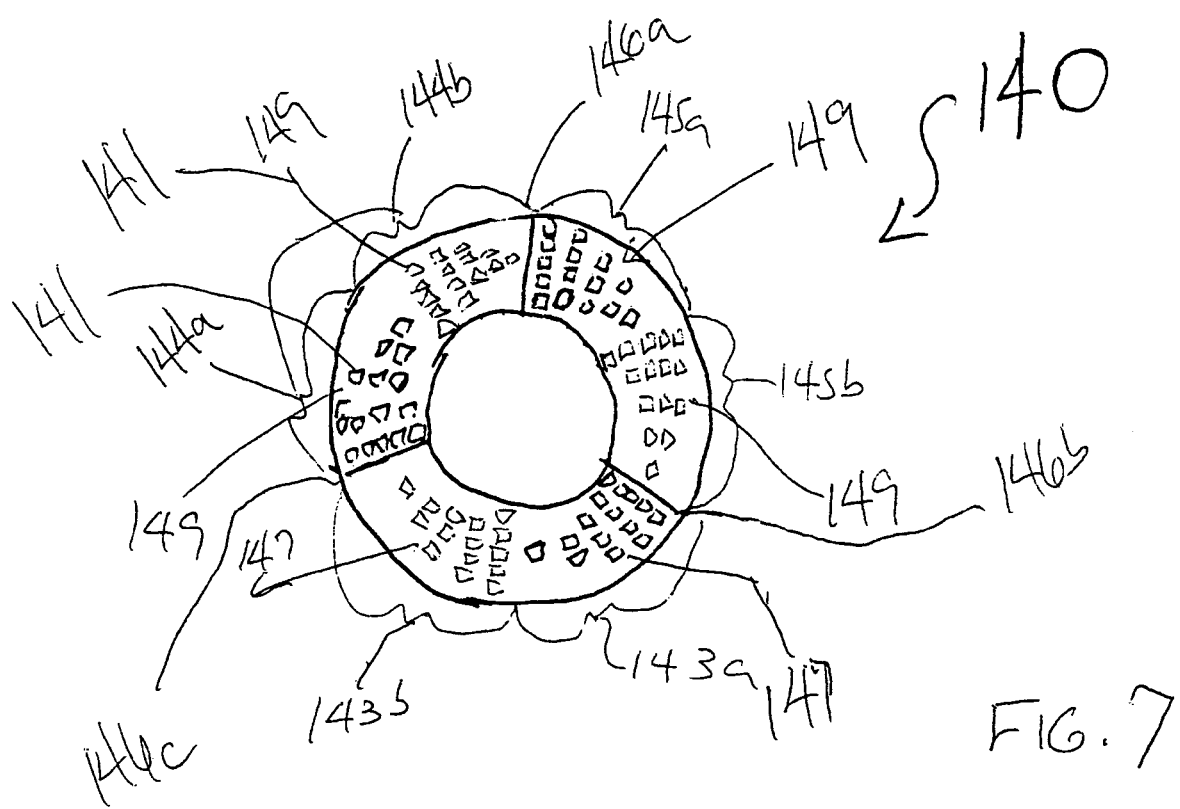
FIGS. 7 and 10 are views of light impinging faces of color wheels according to different embodiments of the invention.

More specifically, in accordance with some embodiments of the invention, the color wheel 18 may be modified to have a more specific form 140 that is depicted in FIG. 7. In addition to the wavelength filtering features depicted in FIG. 2 (for the color wheel 18), the color wheel 140 has features to modulate the intensity of light that passes through the wheel 140 and illuminates the SLMs 24. More particularly, in some embodiments of the invention, during the initial portion of the PWM cycle (i.e., the portion associated with forming the darker pixel intensities) the color wheel 140 decreases light that is incident upon the SLM 24; and as further described below, this restriction causes the portion of the PWM cycle 50 associated with darker pixel intensities to contribute less luminance than the portion of the PWM cycle 50 associated with the brighter pixel intensities. Each time segment in the dark portion of the PWM cycle contributes a smaller amount of light to the total projected pixel intensity whereas a time segment of the same duration during the bright portion of the PWM cycle contributes a larger amount of light to the total pixel intensity. In effect, more granular resolution is imparted to the darker pixel intensities, and this effectively increases the bit depth of the projected pixel intensities without decreasing the size of the time segment 51.

As a more specific example, referring to FIG. 7, the color wheel 140 transitions between a pair of red arcuate regions 144a and 144b, a pair of green arcuate regions 145a and 145b and a pair of blue arcuate region 143a and 143b. Beginning at a transition point 146a, the green arcuate region 145a includes a first optical shading pattern 149a that modulates the optical density of the impinging beam to cause the exiting beam to have progressively more illumination from the initial portion of the arcuate region 145a past the point 146a until the end of the arcuate region 145a in which full illumination occurs. The green arcuate region 145b (that follows the green arcuate region 145a) is identical, in some embodiments of the invention, in that the arcuate region 145b includes another optical shading pattern 149b that progressively increases illumination in a similar manner. Likewise, for the red arcuate region 144a that begins at point 146a of the wheel 140, the wheel 140 includes an optical shading pattern 144a that progressively increases the illumination of the exiting beam from the point 146c until full illumination occurs at the end of the pattern 141a. The second red arcuate region 144b is identical to the first red arcuate region 144a, in some embodiments of the invention. Similarly, the pair of blue arcuate regions 143a and 143b, that begin at point 146b, have a similar arrangement of optical shading patterns 147a and 147b, in some embodiments of the invention.

In some embodiments of the invention, the color wheel 140 is formed from a glass substrate. The optical shading patterns 141a, 141b, 147a, 147b, 149a and 149b may be formed from predominantly reflective metal dots that are located on the face of the substrate through which the beam exits. Thus, the dots may be located on the opposite from the face (of the glass substrate) on which light from the lamp 12 (FIG. 2) impinges. The optical shading patterns 141a, 141b, 147a, 147b, 149a and 149b may each be "half-tone" patterns that start from a specific optical density and become progressively less optically dense from the beginning of the associated PWM cycle until the end of the PWM cycle. The optics 20 (FIG. 1) of the display projection system 10 evenly distributes the illumination across the light beam that leaves the optics 20 and impinges upon the SLM 24.

Figure 6:
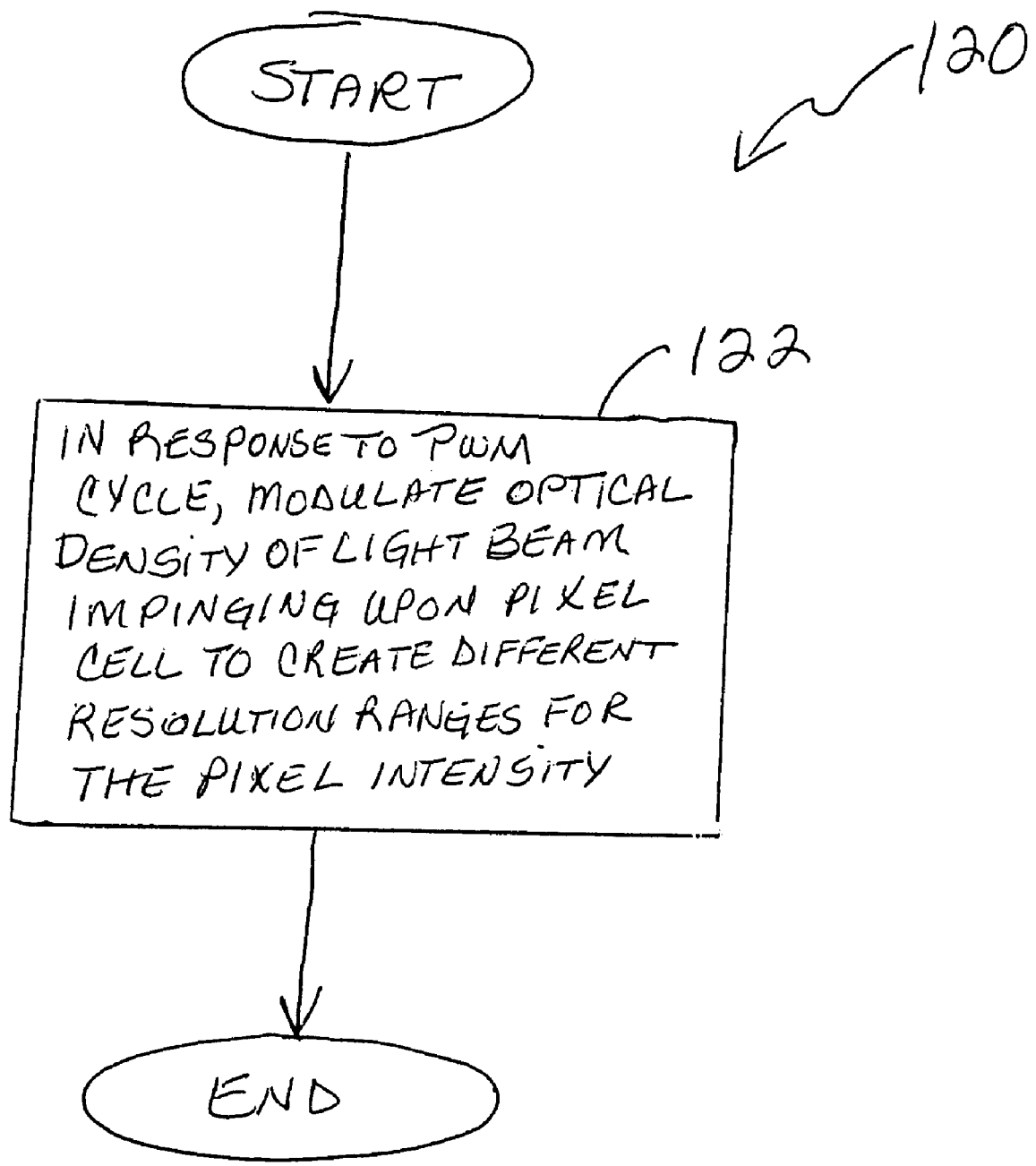
FIG. 6 is a flow diagram depicting a technique to control the contrast of a projected image according to an embodiment of the invention.

Thus, referring to FIG. 6, in accordance with an embodiment of the invention, a technique 120 includes in synchronization to a start of PWM cycle, modulating (block 122) the optical density (and thus, modulating the illumination) of a light beam that impinges on an SLM to create different resolution ranges for the SLM pixel intensity.

Referring to FIG. 8, therefore, in accordance with an embodiment of the invention, a particular pulse width modulation cycle 50 may start at time $T_0$ and end at time $T_E$. In accordance with the PWM count value from the LUT 38, a reflective portion 52 of the pulse width modulation cycle 50 lasts until time $T_N$. The progressive optical shading by the optical shading pattern 141a, 141b, 147a, 147b, 149a and 149b may last from time $T_0$ until time $T_M$, a time in this example less than time $T_N$. Thus, due to the illumination modulation by the color wheel 140, the illumination that falls on the SLM 24 during time $T_0$ to $T_M$ varies. Therefore, as can be appreciated from FIG. 8, the longer the reflective portion of the pulse width modulation cycle 50, the smaller the effect the wheel's optical density modulation has on the projected pixel intensity. It does enable longer a slower PWM clock to be used to count out the LUT drive values than would otherwise be suitable. The LUTs must account for a progressively larger incremental pixel intensity change per PWM clock during the PWM cycle, but this easily computed from the wheel's optical density profile vs. time.

The optical density modulation may produce the exemplary pixel intensity temporal profile depicted in FIG. 9. For a "white" pixel, the pixel reflective state should be asserted at time $T_0$ and last until time $T_E$, the end of the PWM cycle 50. However, due to the illumination modulation by the color wheel 140, the corresponding pixel intensity waveform 150 moves upwardly from time $T_0$ until time $T_M$, at which point, the full "white" intensity appears. As also depicted in FIG. 9, the optical density modulation affects a "black" pixel, represented by the waveform 155, despite the fact that the pixel is never turned on from time $T_0$ to time $T_E$. By reducing the illumination on the SLM for a portion of the PWM cycle period, the black pixel intensity is also lower than it would be without the illumination modulation. This gives an important advantage in overall system contrast.

For a dark gray pixel, without the illumination modulation by the color wheel 140, the pixel would be set to its bright state from time $T_0$ to its respective turn-off time $T_{N2}$. However, due to the optical density modulation, the corresponding projected pixel intensity waveform 160 follows an upward slope from time $T_0$ until time $T_{N2}$. As the human visual system perceives the average temporal intensity over time, the area under the curve 150 depicts the proportional brightness that would be perceived. In this example, the perceived gray pixel intensity is approximately one half as bright as it would have been without the color wheel optical density modulation. This demonstrates the increase in effective bit depth created by the illumination modulation.

As mentioned above, in some embodiments of the invention, two back-to-back PWM cycles are used to control the LC pixel cell: a first PWM cycle of one voltage field polarity; and a second successive non-overlapping PWM cycle of the same pixel timing but opposite voltage polarity.

Figure 10:
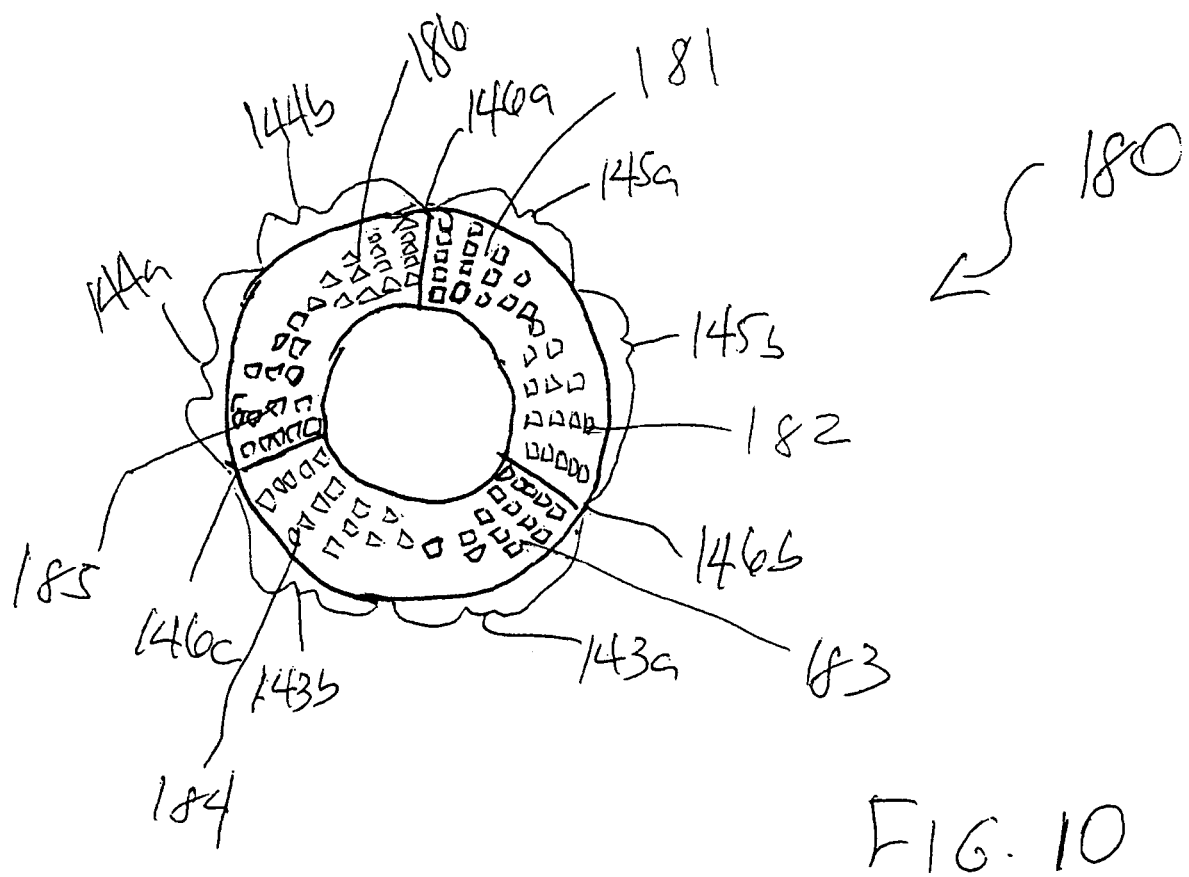

Referring to FIG. 10, in another variation, a color wheel 180 may be used in place of the color wheel 140, in some embodiments of the invention. The color wheel 160 is similar to the color wheel 140 (with like reference numerals being used), except that each arcuate pair 143a and 143b; 144a and 144b; and 145a and 145b has two optical shading patterns that are inverses of each other. Thus, for example, for the green arcuate region 145a, the optical shading pattern 181 is used during the first PWM cycle for purposes of establishing the pixel cell intensity; and a reversed optical shading pattern 182 (appearing in the green arcuate region 145b) is used during the second PWM cycle 181. In this case, the first PWM cycle would be timed by a count-up method, while the second PWM cycle would be timed by a count-down method. Thus, the optical shading pattern 181 progressively increases illumination on the SLM 24 (FIG. 1) as the color wheel 180 rotates, and the optical shading pattern 182 progressively decreases illumination on the SLM as the color wheel 180 rotates. As also depicted in FIG. 10, the other arcuate sections 144a, 144b, 143a and 143b have similar optical shading patterns 185, 186, 183 and 184, respectively.

It is noted that other color wheel configurations may be used in other embodiments of the invention. For example, in other embodiments of the invention, each pair of red, green or blue arcuate regions (of any of the above-described color wheels) may have single optical shading pattern.

Other embodiments are within the scope of the following claims. For example, other optical devices may be used to modulate the illumination that falls on the SLM 24 in other embodiments of the invention. For example, in some embodiments of the invention, a moving optical element other than the color wheel may be used for purposes of modulating the light beam that impinges on the SLMs 24. For example, in some embodiments of the invention, a rotating prism 200 (depicted in FIGS. 11, 12 and 13 for different orientations during its rotation) may be used to perform the modulation.

More specifically, in some embodiments of the invention, the rotating prism 200 may be positioned following the optics 20 in the projection display system 10 (FIG. 1). The color wheel 18 would be replaced by fixed offset dichroic filters in such a system. The rotating prism 200 rotates to produce the different color patterns on an SLM 220 that is illustrated in FIGS. 11, 12 and 13. In the exemplary embodiment described below, the prism 200 is used in a system that uses a single SLM.

Referring to FIG. 11, the prism 200 receives three light beams 202, 204 and 206, that are associated with red, green and blue primary color light beams (for example), respectively. These light beams may be produced by offset dichroic filters or by separate light sources (as examples), depending on the particular embodiment of the invention. The prism 200 produces corresponding red 210, green 212 and blue 214 output light beams, the orientation of which depends on the orientation of the prism 200. For the orientation of the prism 200 depicted in FIG. 11, the output light beams from the prism 200 illuminates the SLM 220 to create red, green and blue top 222, middle 224 and bottom 226 regions, respectively, of the SLM 220, as depicted in FIG. 14. For the orientation shown in FIG. 12, the top 222, middle 224 and bottom 226 regions of the SLM 220 are changed, as depicted in FIG. 15. More particularly, the top region 222 is illuminated by light from the blue beam 214, the middle region 224 is illuminated with red light from the red beam 210 and the bottom region 226 is illuminated with green light from the green beam 212.

The prism 200 rotates from the orientation shown in FIG. 12 to the orientation depicted in FIG. 13. For this orientation, the prism 200 projects red, green and blue light, as shown in FIG. 16, on the SLM 220. More specifically, for the orientation of the prism that is depicted in FIG. 13, the top region 222 of the SLM 220 receives green light, the middle region 224 receives blue light and the bottom region 226 receives red light.

Thus, as depicted in FIGS. 11-16, the prism 200 multiplexes the red, green and blue light beams between the top 222, middle 224 and bottom 226 regions of the SLM 220, as the prism 200 rotates.

In some embodiments of the invention, optical shading patterns may be applied to the faces of the optical prism 200 for purposes of modulating the illumination that is incident on the SLM 220. This illumination modulation, in turn, creates different pixel intensity resolutions, as described above in connection with the color wheels 140 and 180.

Figure 17:
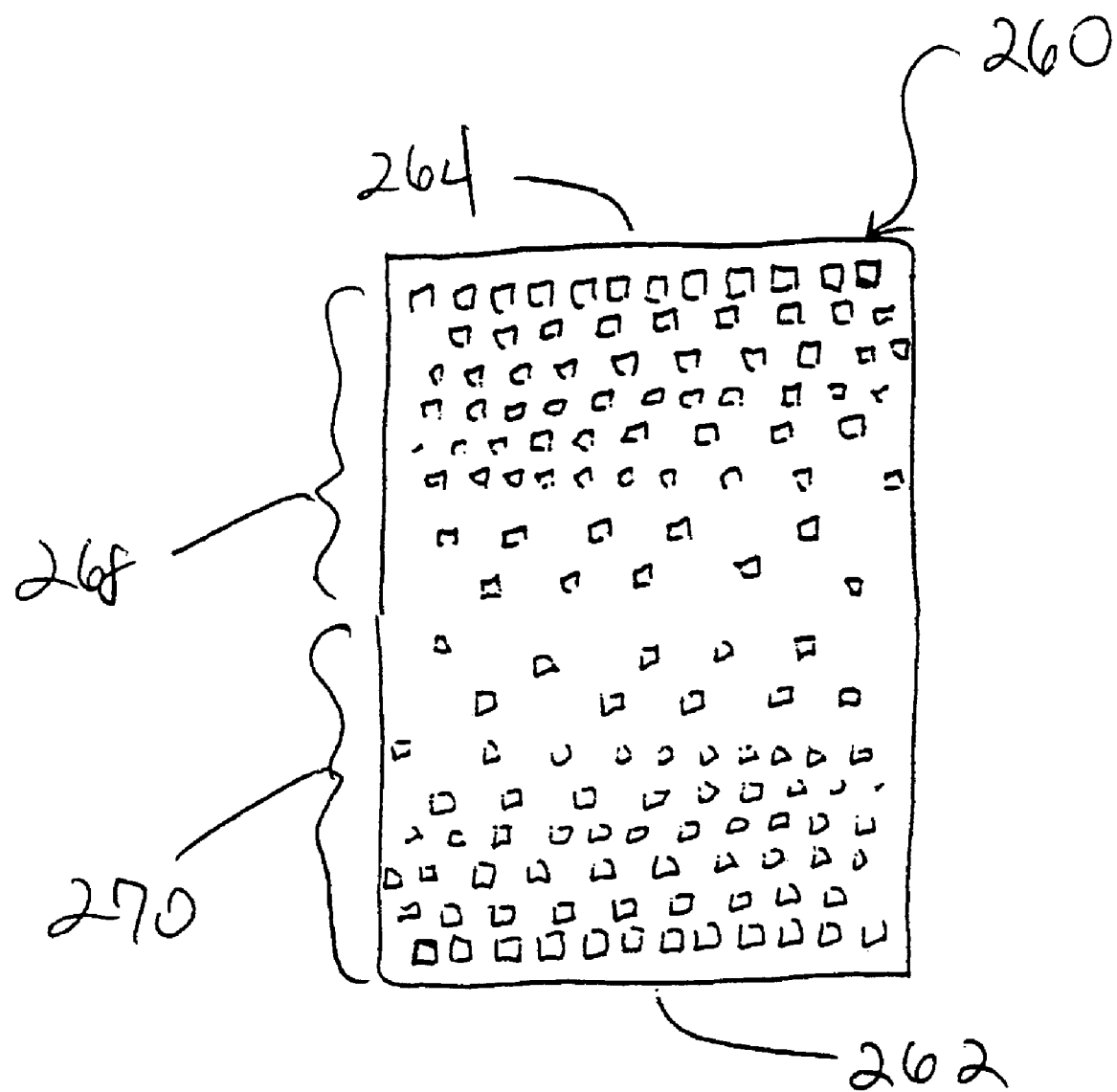
FIG. 17 depicts a face of the prism of FIGS. 11, 12 and 13 according to an embodiment of the invention.

More particularly, referring to FIG. 17, in some embodiments of the invention, the faces of the prism 200 may include optical shading patterns, such as an exemplary optical shading pattern 270 (formed with a half-tone metal pattern of dots, for example) that is formed on an exemplary face 260 of the prism 200. As light passing between the dots on the face of the prism are not further homogenized before impinging on the SLM, the pattern should be formed of dots that are smaller in size than the pixels of the SLM. The prism face 260 begins on a particular edge 262 of the prism 200 and extends to a midpoint of the prism face 260. Thus, during a particular PWM cycle, one or more primary color beams traverse the prism face 260 and are modulated by the optical shading pattern 270 so that the light is modulated similar to the effect achieved by the color wheels 140, 160 and 180.

As also depicted in FIG. 17, from the midpoint of the prism face 260 to another edge 264 of the prism face 260, another optical shading pattern 268 is formed on the prism face 260. This other optical shading pattern 268, in some embodiments of the invention, is inverted with respect to the optical shading pattern 270. This is similar to the arrangement described in connection with the color wheel 180 of FIG. 10. It is noted that in other embodiments of the invention, the optical shading pattern 268 may be replaced with an optical shading pattern that is identical to the optical shading pattern 270, depending on whether or not the PWM clock count method is reversed during the PWM cycle.

Other faces of the prism 200 may have similar optical shading patterns.

Other techniques may be used to modulate the illumination of light that falls on the SLM 24. For example, in other embodiments of the invention, the intensity of the lamp 12 (see FIG. 1) may be controlled during each PWM cycle to establish different pixel intensity resolution ranges. Therefore, instead of using a color wheel or a rotating prism to modulate a fixed intensity output from the lamp 12, the lamp 12 itself may be controlled to modulate the intensity of light that falls on the SLM 24, 26.

Figure 18:
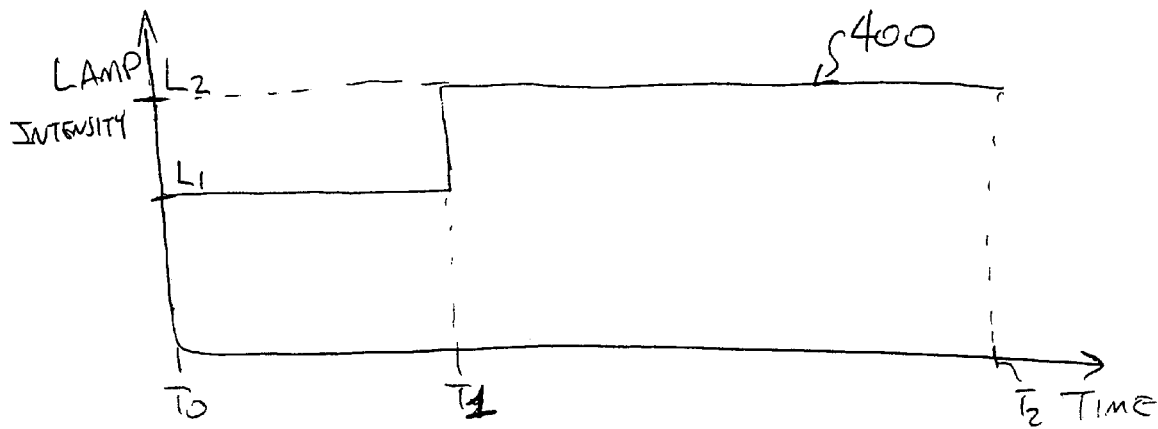
FIGS. 18 and 19 depict output intensity profiles of a lamp of the projection display system during a pulse width modulation cycle according to different embodiments of the invention.

Referring to FIG. 1 in conjunction with FIG. 18, more specifically, in some embodiments of the invention, the lamp 12 may be controlled pursuant to a time-varying profile 400. During time $T_0$ to time $T_1$, the projection display system 10 establishes a first, lower intensity output level (called "$L_1$") to effectively reduce the illuminance contribution during the PWM time segments during time $T_0$ to time $T_1$. At time $T_1$, the projection display system 10 controls the lamp 12 to increase the intensity output level of the lamp 12 to a higher intensity level $L_2$ until the PWM cycle ends at time $T_2$. Thus, from time $T_1$ to time $T_2$, each time segment of the PWM cycle contributes an increased luminance value, as compared to the luminance values contributed during the time $T_0$ to time $T_1$ time interval. Therefore, by modulating the output intensity of the lamp 12 in this fashion, a higher resolution is created for darker pixel intensities, and a lower resolution is created for the brighter pixel intensities, similar to the modulation imposed by the color wheel or rotating prism, described above.

Figure 20:
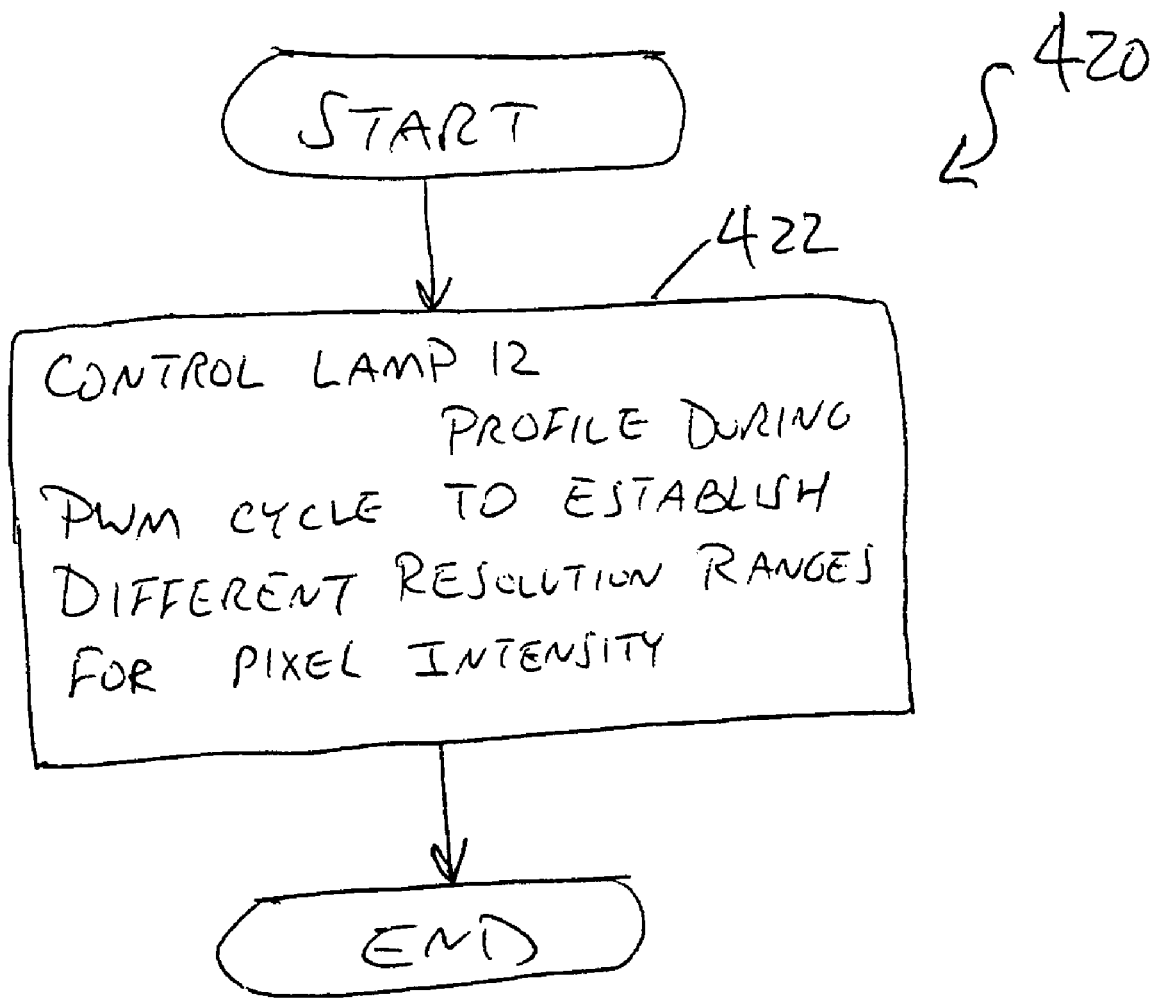
FIG. 20 is a flow diagram depicting a technique to control the lamp to establish different pixel intensity resolutions according to an embodiment of the invention.

In some embodiments of the invention, the lamp 12 may be controlled by the processor 32 (see FIG. 1). In particular, in some embodiments of the invention, the processor 32 may execute the instructions 40 (FIG. 1) that are stored in the memory 36 to cause the processor to perform a technique 420 that is generally depicted in FIG. 20. Referring also to FIG. 20, pursuant to the technique 420, the processor 32 controls (block 422) the lamp 12 so that the lamp 12 has a time-varying output intensity profile during a PWM cycle to establish different tonal resolution ranges for the pixel intensity. Thus, in some embodiments of the invention, the processor 32, in response to execution of the instructions 40, writes the appropriate data to a lamp control interface 35 (that is coupled to the system bus 34, as depicted in FIG. 1) at the appropriate times to control the time-varying output intensity profile of the lamp 12.

Figure 19:
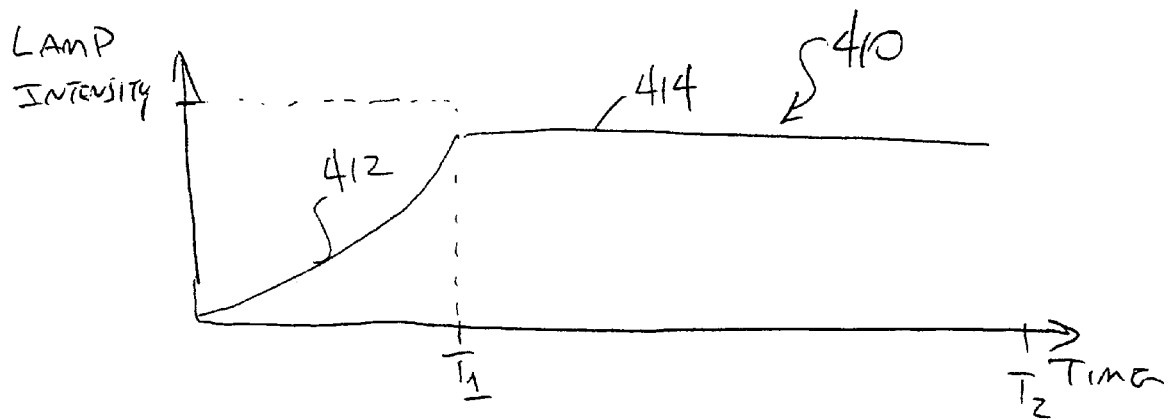

It is noted that the step profile of FIG. 18 is not the only intensity profile that may be used. For example, referring to FIG. 1 in conjunction with FIG. 19, in some embodiments of the invention, the processor 32 may control the lamp 12 via a time-varying intensity profile 410, a profile that includes a non-linear segment 412 from time $T_0$ until time $T_1$. As shown in FIG. 19, from time $T_1$ to time $T_2$, in some embodiments of the invention, the processor 32 may control the lamp 12 so that the lamp has a general constant output intensity level 414 during this time interval. Other variations and other time-varying profiles are possible in other embodiments of the invention.

Other embodiments are within the scope of the appended claims. For example, in some embodiments of the invention, the pixel cells of SLM 24 may be controlled in more of an analog fashion in which the reflectivity of each pixel cell is incrementally adjusted to control the corresponding pixel intensity. Thus, in these embodiments of the invention, PWM is used in conjunction with multiple pixel drive voltages to form a hybrid control scheme or may be not used in favor of a full analog drive scheme.

The above-described embodiments modulate the illumination source light output for purposes of establishing different pixel intensity resolutions and thus, effectively increasing the bit depth of the PWM modulation. However, in other embodiments of the invention, the illumination falling on the SLM(s) may be adjusted for purposes of improving the perceived contrast of the projected image.

More specifically, the human visual system has a tremendous range. When confronted with a dark image under dark ambient lighting conditions, various physiological effects come into play to improve the visual sensitivity. Unfortunately, this may lead to an undesirable situation in which low levels of light no longer appear black. At other times, when the ambient level of light in the room is high or when the content of the image has sufficient bright area, the sensitivity of the human visual system is reduced, and the low levels of light cannot be perceived. Therefore, in accordance with embodiments of the invention, the ambient lighting condition and the estimated human visual response are used to control the intensity of the lamp 12 for purposes of improving the perceived contrast of the projected image.

Figure 21:
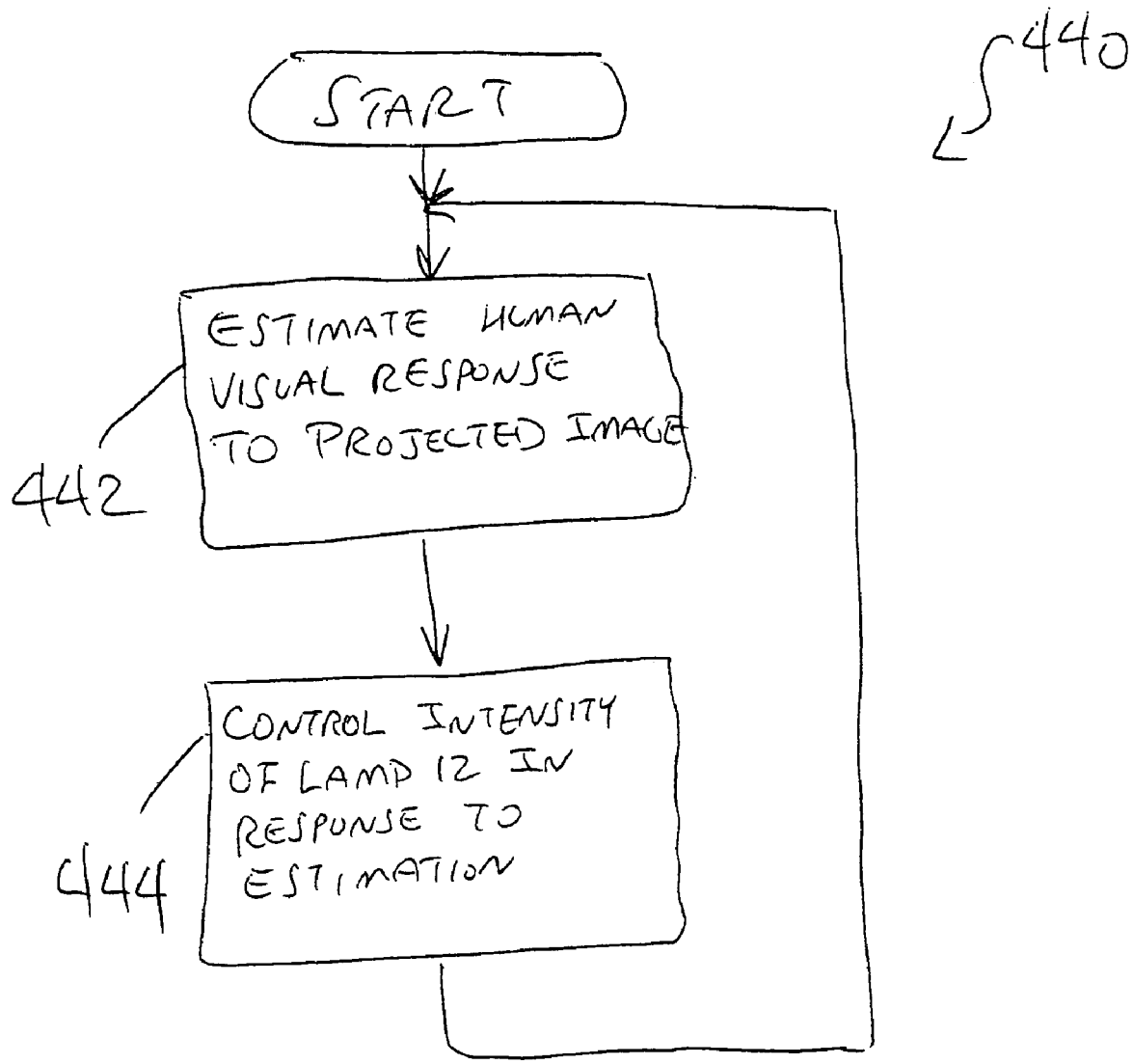
Figure 20:
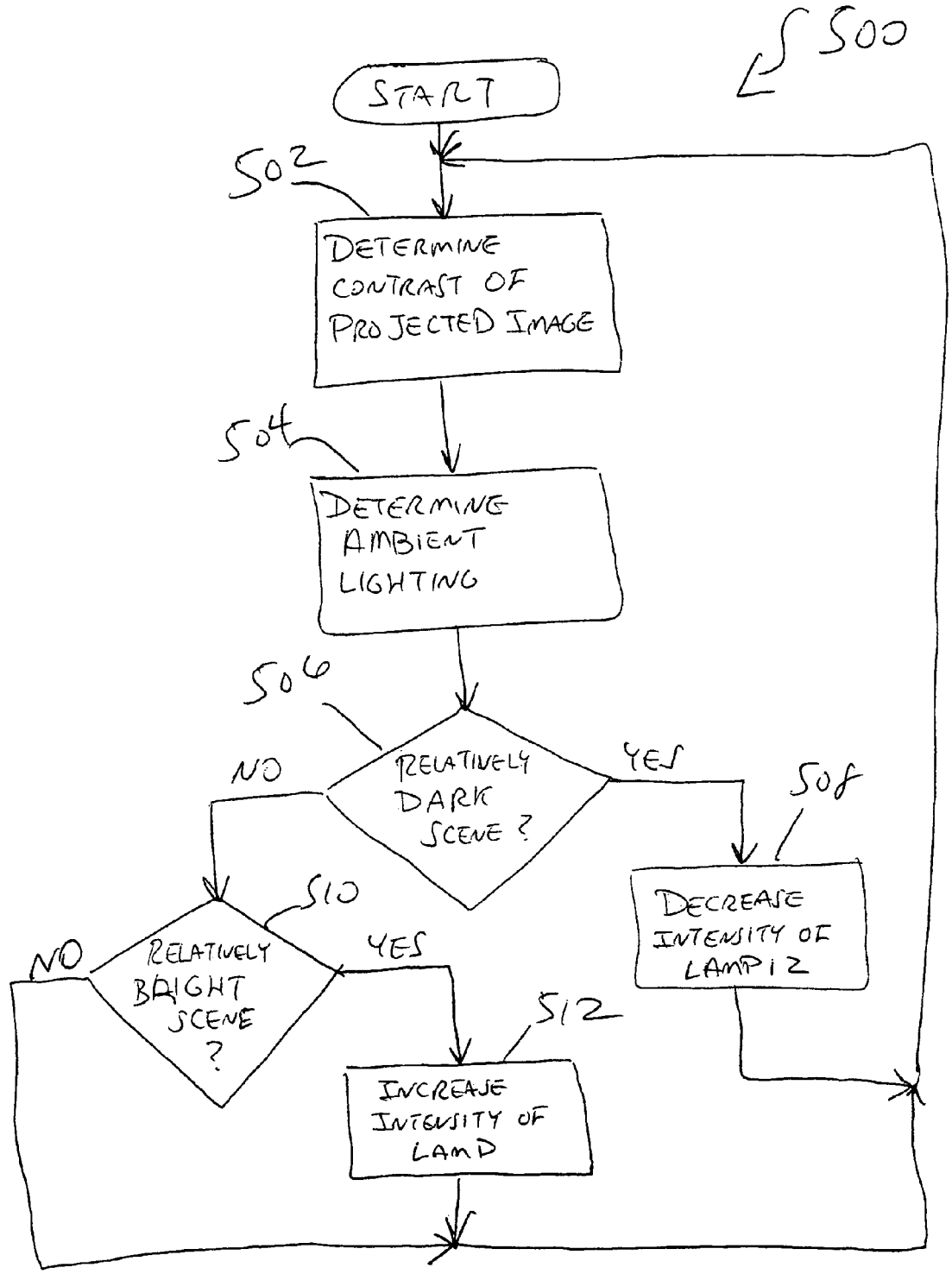

Referring to FIG. 21, in some embodiments of the invention, a technique 440 may be used to improve the perceived contrast of the projected image. Pursuant to the technique 440, the projection display system estimates (block 442) the human visual response to the projected image. This estimation may be in the form of a mathematical model that takes into account the human visual response model, such as the physiological changes occurring in the iris, retina and the overall perception by the eye to the projected image. The estimation 442 may also take into account, for example, the ambient lighting conditions.

As a more specific example, FIG. 22 depicts a technique 500 that may be used by the projection display system 10 (FIG. 1) to improve the contrast of the projected image. Referring to FIG. 1 in conjunction with FIG. 22, pursuant to the technique 500, the processor 32 determines (block 502) the contrast and mean brightness of the projected image. This contrast determination may be made, for example, by comparing the brightest intensities of the image to the darkest intensities of the image. Next, pursuant to the technique 500, the processor 32 determines (block 504) the ambient lighting conditions. Therefore, in some embodiments of the invention, the projection display system (FIG. 1) may include a light sensor (not depicted in FIG. 1) for purposes of measuring the ambient lighting conditions.

Next, according to the technique 500, the processor 32 determines (diamond 506) whether the projected image is a relatively dark scene. This determination is made based on an analysis of the supplied video data values, such as the mean brightness calculated earlier. If the determination 506 concludes that the scene is relatively dark and the ambient environment is also dark, then the processor 32 decreases (block 508) the intensity of the lamp 12. For example, the processor 32 may write to the lamp control interface 35 (FIG. 1) to decrease the intensity output level of the light. It is noted that the decrease (or increase) associated with the lamp 12 are relative increases and decreases, in that the light modulation discussed above in connection with increasing the bit depth of the PWM cycles may still be used, although the relative low and high intensity levels of the output of the lamp 12 are decreased pursuant to block 508.

If the processor 32 determines (diamond 506) that the scene is not relatively dark, then the processor 32 determines (diamond 510) whether the scene is relatively bright. If the scene is relatively bright and the ambient environment is also bright, then the processor 32 increases (block 512) the intensity of the lamp 12.

It is noted that the technique 500 may be performed in a continual loop to constantly monitor the contrast and average tonality or "key" of the projected image and ambient lighting conditions, in some embodiments of the invention. Furthermore, in some embodiments of the invention, the processor 32 may execute the instructions 36 for purposes of causing the processor 32 to perform the technique 500.

Figure 23:
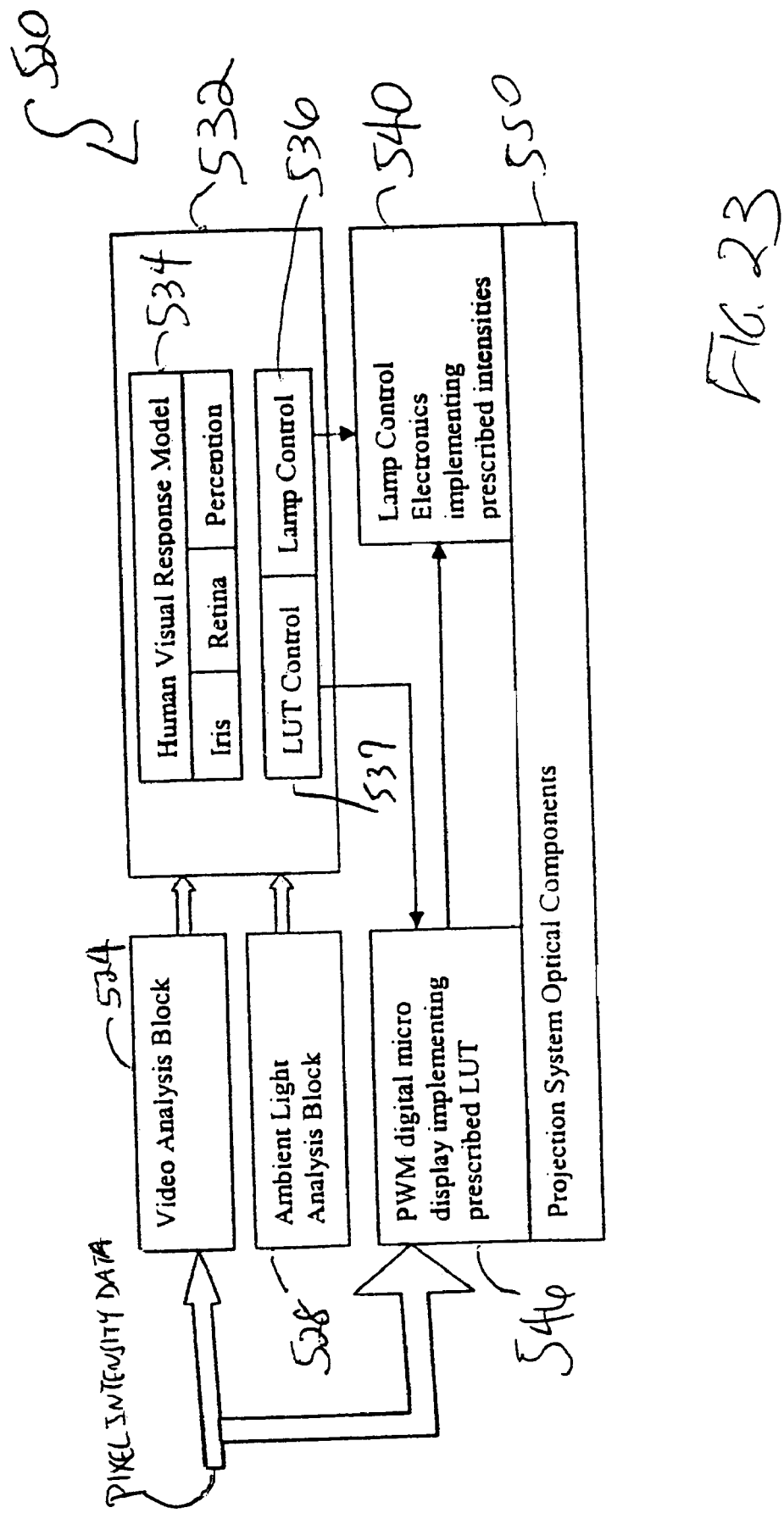
FIG. 23 is a block diagram of a projection display system according to another embodiment of the invention.

In some embodiments of the invention, a projection display system 520 that performs the above-described contrast optimization of the projected image may have the general structure that is depicted in FIG. 23. In this manner, the projection display system 520 may include a video analysis block 524 to perform an analysis of the contrast and mean brightness of the projected image. The projection display system 520 also includes an ambient light analysis block 528 for purposes of determining the ambient lighting in the environment where the projected image appears. The projection display system 520 may also include estimator 532 to use a human visual response model 534 to analyze such factors as iris reaction, retina behavior and the perceived contrast of the projected image. The estimator 532 may also include look-up-table (LUT) control 537 and lamp control 536 control blocks for purposes of determining the values to retrieve from the corresponding PWM LUT for purposes of determining the intensity level at which to set the lamp. Furthermore, the projection display system 520 may include a lamp controller 540 to control the lamp intensity in response to the estimation of the human visual response from the estimator 532, a PWM digital micro display 546 (i.e., a SLM) and projection system optical components 520.

Other embodiments are within the scope of the following claims. For example, in some embodiments of the invention, the modulation of the beam of light may be performed by a spatial light modulator (SLM) instead by the lamp driver, rotating optics or a color wheel. More specifically, in these embodiments of the invention, the lamp may produce a beam of light that has a relatively constant illumination level. This beam of light, in turn, may pass through a color wheel (that does not perform light modulation) and through optics that direct the beam of light to an SLM. This SLM then modulates the illumination of the beam to create different tonal resolution ranges for the pixel intensity. The modulated beam, in turn, is then routed by optics of the projection system to one or more additional SLMs for purposes of modulating the beam to produce the projected image. Therefore, many variations are possible and are within the scope of the appended claims.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   modulating an illuminating beam of a light to establish a pixel intensity; and
   temporarily modulating the illuminating beam in response to the established pixel intensity, wherein the act of modulating comprises:
   changing a driving of the illumination source,
   wherein a modulation period comprises a number of modulation counts and the act of modulating comprises:
   applying a first illumination level for a first range of modulation counts; and
   applying a second illumination level different than the first illumination level for a second range of modulation counts, wherein the second illumination level is higher than the first illumination level.

2. The method of claim 1, further comprising:
   using the modulation to apply a gamma transfer function to pixel intensity data.

3. The method of claim 1, wherein the act of modulating the illuminating beam comprises:
   progressively increasing an intensity of the illuminating beam from the beginning of a time interval in which the pulse width modulating occurs.

4. The method of claim 3, wherein the act of progressively increasing the intensity comprises:
   directing the illuminating beam through an optical shading pattern of reflective dots.

5. The method of claim 1 wherein the act of modulating the illuminating beam comprises:
   forming one intensity of the illuminating beam at the beginning of a time interval in which the pulse width modulating occurs and forming a second intensity of the illuminating beam at a later point in the time interval.

6. The method of claim 5, wherein the act of progressively increasing the intensity comprises:
   directing the illuminating beam through an optical shading pattern of reflective dots.

7. The method of claim 1, wherein the act of modulating comprises:
   starting the modulation of the illuminating beam in synchronization to the beginning of a time interval in which the pulse width modulating occurs.

8. The method of claim 1, wherein the pulse width modulating comprises:
   operating a pixel cell of a spatial light modulator in accordance with a value stored in a look-up table.

9. The method of claim 1, wherein the pulse width modulating comprises:
   operating a pixel cell in either a reflective state or a non-reflective state.

10. An apparatus comprising:
    a spatial light modulator to modulate a beam of light to establish a pixel intensity; and
    a second modulator to modulate an illuminating beam in response the established pixel intensity, wherein the second modulator progressively increases the illumination of the beam from the beginning of a time interval in which the pulse width modulating occurs, wherein the second modulator synchronizes operation with the spatial light modulator to cause the illuminating beam to pass through a more opaque portion of the second modulator when the spatial light modulator forms darker pixels relative to another portion of the second modulator through which the illuminating beam passes when the spatial light modulator forms brighter pixels.

11. An apparatus comprising:
a spatial light modulator to modulate a beam of light to establish a pixel intensity; and
a second modulator to modulate an illuminating beam in response the established pixel intensity, wherein the second modulator progressively increases the illumination of the beam from the beginning of a time interval in which the pulse width modulating occurs, wherein the second modulator modulates the illumination to apply a first illumination level for a first range of pixel intensities and a second illumination level higher than the first illumination level for a second range of pixel intensities, the pixel intensities in the second range being brighter than the pixel intensities in the first range.

12. An apparatus comprising:
a spatial light modulator to modulate a beam of light to establish a pixel intensity; and
a second modulator to modulate an illuminating beam in response the established pixel intensity, wherein the second modulator comprises:
an optical element to rotate to modulate the illumination, wherein the beam passes through the optical element and a portion of the optical element associated with darker pixel intensities is more opaque than a portion of the optical element associated with brighter pixel intensities.

13. The apparatus of claim 12, wherein the optical element comprises a color wheel.

14. The apparatus of claim 12, wherein the optical element comprises a prism.

15. The apparatus of claim 12, wherein the second modulator further comprises an optical shading pattern on the optical element through which the beam passes.

16. The apparatus of claim 12, wherein the optical element comprises reflectors to deflect at least some of the light away from a remainder of the beam.

17. The apparatus of claim 16, wherein the reflectors comprises half-tone patterns.

18. A system comprising:
a flash memory to receive data indicative of a pixel intensity;
a spatial light modulator to modulate a beam of light to establish the pixel intensity in response to the data; and
a second modulator to modulate the illumination level of the spatial light modulator to apply different illumination levels in response to the pixel intensity, wherein the second modulator modulates the illumination level to apply a first illumination level for a first range of pixel intensities and a second illumination level different than the first illumination level for a second range of pixel intensities, the pixel intensities in the second range being different than the pixel intensities in the first range.

* * * * *